United States Patent [19]

Mochizuki et al.

[11] 4,316,665
[45] Feb. 23, 1982

[54] PROJECTION DEVICE

[75] Inventors: Noritaka Mochizuki, Yokohama; Setsuo Minami, Kawasaki; Yoshiya Matsui, Yokohama; Koyo Midorikawa, Tokyo; Atsuo Tsunoda, Fuchu; Hidetoshi Murase; Mikio Suzuta, both of Yokohama; Masazumi Moriwaki, Tokyo, all of Japan

[73] Assignee: Canon Kabushiki Kaisha, Tokyo, Japan

[21] Appl. No.: 100,858

[22] Filed: Dec. 6, 1979

[51] Int. Cl.$^3$ .................................... G03B 27/00
[52] U.S. Cl. ................................. 355/1; 355/8; 355/11; 355/46; 355/50; 355/51
[58] Field of Search .............. 355/1, 8, 11, 50, 46, 355/51, 52

[56] References Cited

U.S. PATENT DOCUMENTS

| | | | |
|---|---|---|---|
| 3,580,675 | 5/1971 | Hieber | 355/50 |
| 3,584,952 | 6/1971 | Gundlach | 355/52 |
| 3,592,542 | 7/1971 | Käufer | 355/51 X |
| 4,147,412 | 4/1979 | Kawamura et al. | 355/1 |
| 4,168,900 | 9/1979 | Adachi | 355/1 |
| 4,193,679 | 3/1980 | Mochizuki et al. | 355/1 |
| 4,194,827 | 3/1980 | Bleeker et al. | 355/1 |

Primary Examiner—Richard A. Wintercorn
Attorney, Agent, or Firm—Fitzpatrick, Cella, Harper & Scinto

[57] ABSTRACT

In a slit exposure type copying machine, a projection device basically includes transmission type element lens systems each including a lens having a great length in the direction of the optic axis thereof as compared with the effective diameter thereof. A part area of an original is projected upon a predetermined part area on an image plane and the light intensity distribution of the projected part area has a predetermined central area controlled by lens aperture eclipse and extending diametrically from at least the optic axis and a marginal area lying outwardly of the central area and weak in light intensity. A plurality of such element lens systems are substantially equidistantly arranged in the lengthwise direction of the slit in a plane perpendicular to the optic axis so that the marginal areas in at least the element lens systems are superposed upon one another. Further, the element lens systems are arranged in a plurality of rows so that each row is positioned just intermediate the adjacent row, whereby even if there is an error in the arrangement interval of the element lens systems, the uniformity, in the slit area, of the exposure amount time-integrated in the original scanning direction is maintained.

11 Claims, 19 Drawing Figures

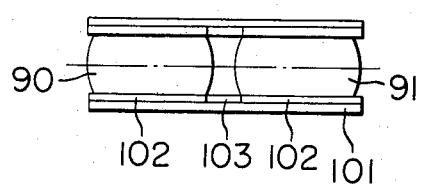
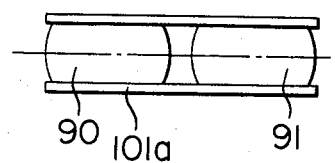
FIG. 14A  FIG. 14B
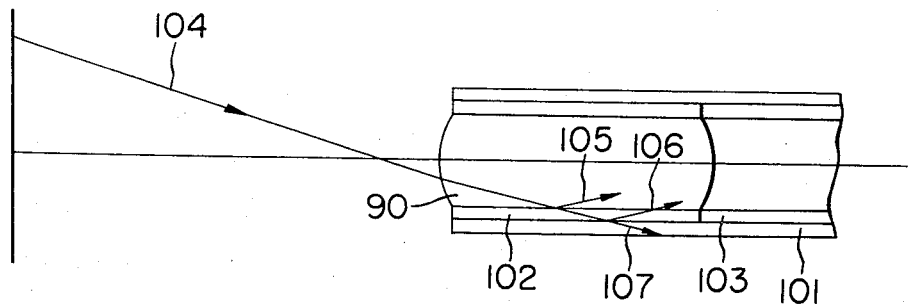
FIG. 15A
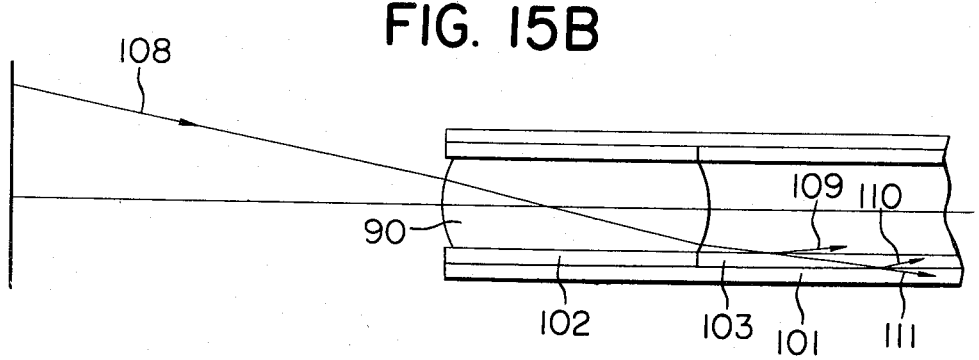
FIG. 15B

PROJECTION DEVICE

BACKGROUND OF THE INVENTION

1. Field of the Invention

This invention relates to a projection device for projecting a mirror image or inverted image of an object upon a plane of projection, and more particularly to a projection device suited for use with a compact slit exposure type copying machine having an image transfer process.

2. Description of the Prior Art

In the projection device of the copying machine or the like according to the prior art, the projection lens system thereof has comprised an ocellar lens consisting of a single lens, but this has suffered from a problem that the conjugate from the object surface to the image plane is long due to the limited angle of view taking the depth of focus or the like into consideration and necessarily the device becomes bulky. To overcome such problem and to make the size of the entire copying machine compact, there is known a projection device in which the projection lens system comprises an ommateal lens having the same angle of view as the conventional one and consisting of a plurality of lenses and the individual lenses have the transmitting function of rendering part of an object to be projected into part of a corresponding image so that the projected image of the entire object is formed on a plane of projection by the entire lens system.

U.S. Pat. No. 3,584,952 and U.S. Pat. No. 3,592,542 disclose projection devices in which a plurality of lens systems are arranged along the lengthwise direction of the slit portion and by these lens systems, the band-like area of an original to be copied is projected upon a photosensitive medium as the synthesis of part images to thereby form an entire image. By making the lenses into an ommateal lens, the effective diameter of each lens is reduced and the conjugate corresponding to the same angle of view becomes shorter, thus making the entire device compact. That is, in the projection device shown in U.S. Pat. No. 3,584,952, a lens system comprises three front, intermediate and rear lenses arranged in the direction of the optic axis so that by the front lens, an intermediate image corresponding to a part of an original is formed on the intermediate lens disposed between the front lens and the rear lens and this intermediate image is formed as the final image on a photosensitive medium by the rear lens. This intermediate lens performs the function of a field lens and has nothing to do with the original projecting function. However, this field lens has an important character in that it maintains uniform the brightness of the projected image formed on the photosensitive medium. Likewise, in U.S. Pat. No. 3,592,542, a lens system comprises three sets of front, intermediate and rear lenses, each set comprising two lenses. In this device, three lenses or three sets of lenses are arranged in the direction of the optic axis and the device has a disadvantage that setting or otherwise adjusting the mutual lenses without eccentricity is difficult.

On the other hand, a lens having a great length in the direction of the optic axis thereof as compared with the effective diameter thereof is disclosed in British Pat. No. 954,629 whose complete specification was issued on Apr. 8, 1964.

However, the lens shown in this British Patent is not a telecentric lens system, and is not of the type in which an intermediate image is formed between a first lens and a second lens and in which a predetermined light intensity distribution on the plane of projection is controlled. The lens disclosed in the British Patent is one in which the image of a part of an object is projected by one lens system and this patent does not disclose the technique of synthesizing individual part images by a lens array construction.

Japanese Patent Publication No. 30787/1970 discloses an example of the projection lens system which synthesizes part images by a lens system array and which adopts the telecentric arrangement. However, this projection lens system is a conventional lens system and is not a lens having a great length in the direction of the optic axis thereof as compared with the effective diameter thereof.

Our co-pending U.S. Application Ser. No. 889,404, abandoned, discloses a construction which has array-like projecting optical system comprising a plurality of lenses and in which each of the projecting optical system has a first and a second lens between which the intermediate image of a part of an original is formed, the first and second lenses having a considerably great length in the direction of the optic axis thereof as compared with the effective diameter thereof, and in which the first lens is an emergence side telecentric system and the second lens is an incidence side telecentric system. However, a feature of the invention disclosed in said Ser. No. 889,404, abandoned, is that the light intensity distribution of the final image plane corresponding to the effective object field is controlled not by lens aperture eclipse but by the field stop in the intermediate image plane portion. By controlling the light intensity distribution by the field stop so that a uniform light intensity distribution is provided in the image plane area and by causing the light intensity distributions of adjacent element lens systems in the image plane area to be superposed upon one another, the uniformity, in the slit area, of the exposure amount distribution time-integrated in the original scanning direction is improved. However, there is a problem that if there is an error in the setting of the field stop, the uniformity of the exposure amount distribution is greatly destroyed. Further, the provision of the field stop itself is cumbersome. In view of these prior arts, the present invention provides an entirely novel projection device.

Optical fiber (tradename: Cellfock) having an image forming action in which the refractive index is gradually decreased from the radially central portion thereof toward the marginal portion thereof is known in Japanese Patent Publication No. 28058/1972, whereas the bar lens according to the present invention has a refractive index uniform over the entire lens.

SUMMARY OF THE INVENTION

It is an object of the present invention to provide a projection device which is suited for use with a compact slit exposure type copying machine or the like and which have a plurality of lenses each having a great length in the direction of the optic axis thereof as compared with the effective diameter thereof, and more particularly, an entirely novel projection device which ensures the exposure amount distribution time-integrated in the original scanning direction to secure uniformity irrespective of any error in the arrangement interval of the lenses.

Such object is basically achieved by forming transmission type element lens systems by coaxially using two lenses each having a great length in the direction of the optic axis thereof as compared with the effective diameter thereof, arranging these element lens systems substantially equidistantly in the lengthwise direction of a slit, further arranging these element lens systems in two rows so that each of them is positioned intermediate the adjacent row, using a light absorbing layer or a light scattering layer on the outer peripheral portion of the lenses as a stop extending in the direction of the optic axis without providing a stop between the two lenses, namely, using lens aperture eclipse to form, on an image plane, a light intensity distribution which differs in light intensity at least from the central area to the marginal area, and causing the marginal area which is weaker in light intensity than the central area to be superposed on the marginal area of at least one adjacent element lens system.

The invention will become more fully apparent from the following detailed description thereof taken in conjunction with the accompanying drawings.

BRIEF DESCRIPTION OF THE DRAWINGS

FIGS. 14 to 16 illustrate the light absorbing member according to the present invention.

DESCRIPTION OF THE PREFERRED EMBODIMENTS

Figure 1:
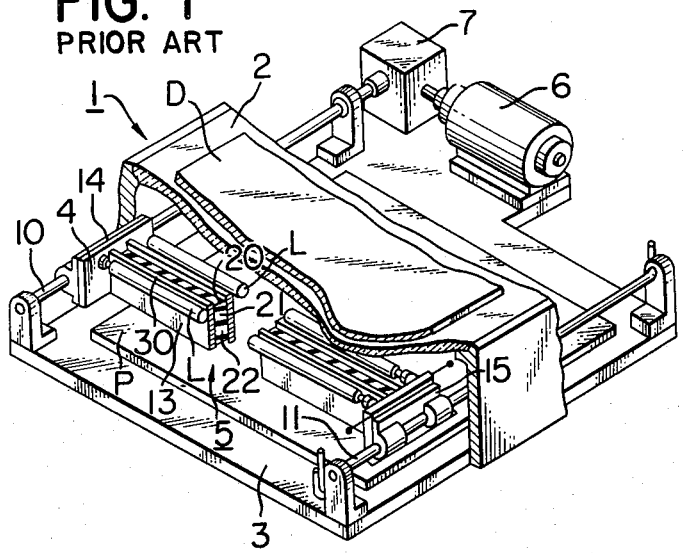
FIGS. 1 to 4 illustrate the well-known copying machine.

FIG. 1 shows the copying apparatus described in aforementioned U.S. Pat. No. 3,584,952. The apparatus generally designated by 1 comprises a transparent platen 2 for supporting an original document D to be copied with the front surface of the document facing downwardly, a support plate 3 fixed relative to a photosensitive plate P having a layer of photosensitive material facing upwardly, a movable carriage 4 for supporting an optical imaging device generally designated by 5, and a drive system including a reversible constant speed electric motor 6 and a gear box 7 to drive the carriage 4 across the opposed surface of the document and the photosensitive surface P.

The carriage 4 is mounted on a drive screw 10 and a bearing bar 11 arranged in spaced apart relationship on the opposite ends of the support plate 3, the axes of the screw 10 and bar 11 being parallel to each other. The gear box 7 is connected to the drive screw 10 and is suited for rotating the drive screw to drive the scanning system 5 in either direction. The drive system must be suited for moving the optical imaging system in either direction with a predetermined movement suited for the system to be reversed when it comes to either end of its stroke.

The system 5 comprises a long housing 13 supported at one end by a block 14 threadably engaged with the screw 10 and at the other end by a block 15 slidably receiving the bar 11, and the blocks 14 and 15 form a part of the carriage 4 to be moved therewith. A pair of fluorescent lamp L mounted in suitable sockets and supplied with energy from a suitable power source (not shown) is mounted between the blocks 14 and 15 and thereon. These lamps are disposed physically parallel to each other on the opposite sides of the housing 13 in the neighborhood of the side surface of the document D to be copied, in order to illuminate the document and create the light rays thereof.

Figure 2:
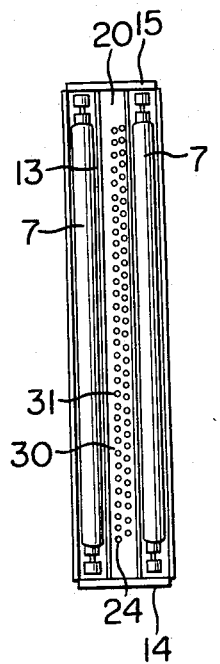

Within the housing 13, there are mounted three long lens groups 20, 21 and 22 arranged coaxially between the document D and the photosensitive surface P and along the length of the housing. The uppermost lens group 20 is formed by a plurality of lenses 24 extending along the full length of that lens group. As seen in FIG. 2, the lens group 20 is formed by two parallel rows of lenses 24, and the second row is shifted by a distance equal to one half of the distance between any two lenses in the opposed first row. The lens groups 20 should desirably be made of shaped plastics in which all the lenses 24 are integral with the material forming the other part of that group.

The lens groups 21 and 22 are entirely similar to the lens group 20 and are arranged relative to the lens group 20 in such a manner that the lenses of each group are coaxial with the lenses of the other lens group to form a single imaging device.

Figure 3:
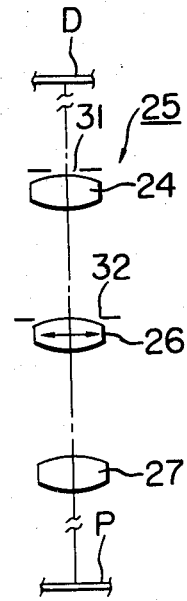

FIG. 3 shows an element lens system generally designated by 25 and formed by coaxially arranged lenses 24, 26 and 27 of the lens groups 20, 21 and 22. In FIG. 3, reference numeral 31 designates an aperture stop and reference numeral 32 denotes a field stop.

The aperture stop 31 is formed by openings in an apertured plate 30 and each opening has the function of controlling the quantity of light entering the element lens system 25. The field stop 32 has the function of controlling the coverage of an objective area and thereby restricting the element area scanned by any imaging device 25 at any one time. In each imaging device, the lens element 24 serves as the objective lens for that imaging device and is suited for converging the element area of the document upon the field lens 26. As an example, in FIG. 4, a character R has its image formed on the focal plane of the lens 24 which is coincident with the interior of the lens 26, and it is expressed by the locus of light rays. It should be noted that the character R is reversed and again brought back to its initial condition.

Figure 4:
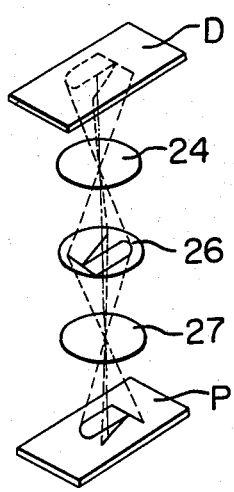

The lens 27 forms on the photosensitive surface P the image of the character R in the field lens 26 and from the example of FIG. 4, it is to be noted that the character R is now in reversed image (mirror image) relationship with the original letter on the document D. Each imaging device in the system 5 is then suited for reproducing the element area of the objective plane such as the document D and forming a corresponding reversed image on the image plane. The complex of the element images so formed provides a complete photographic display of the information on the document D. Where the image plane P presents the form of a reusable electrostatic copying plate such as, for example, a xerograph selenium photo-conductive plate or drum, the latent image on the plate or drum is reversed so that the image developed by toner particles may be transferred to a paper sheet as an erect image.

Figure 5:
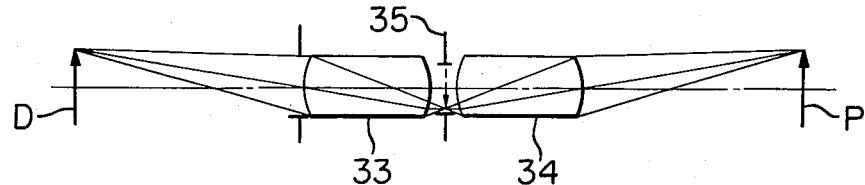
FIG. 5 illustrates the element lens system according to our co-pending application.
Figure 6:
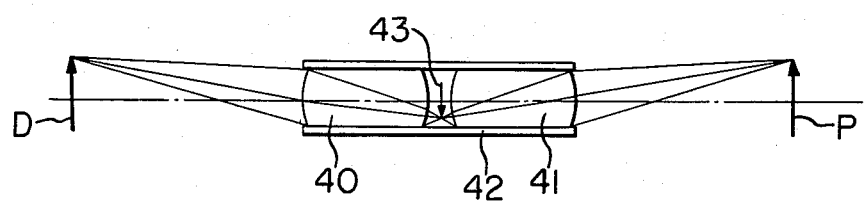
FIGS. 6 to 8 illustrate a first element lens system according to the present invention.
Figure 7:
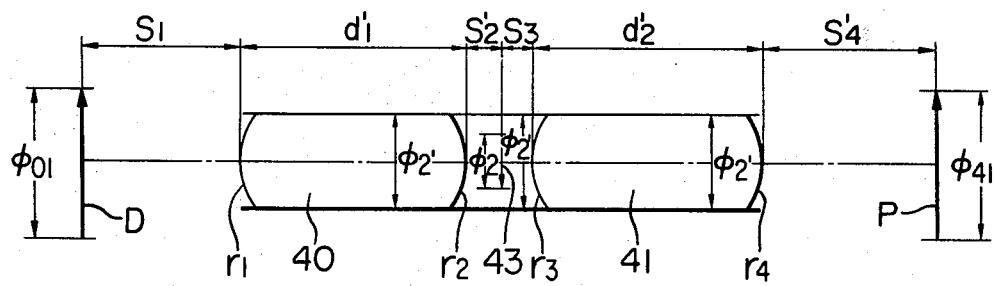
Figure 8:
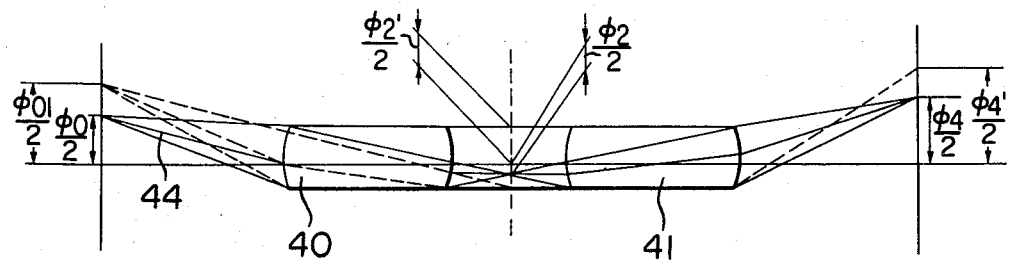
Figure 9:
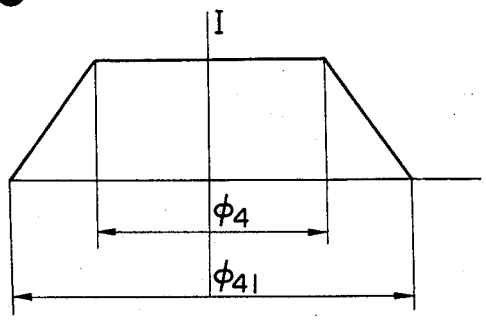
FIG. 9 is a cross-sectional view of the light intensity distribution on the plane of projection of the first element lens system.
Figure 10:
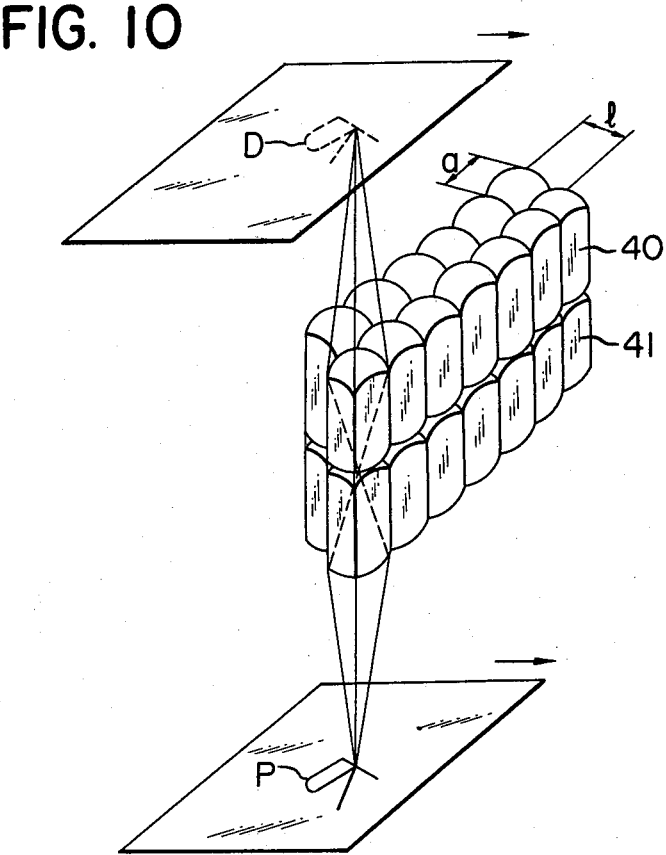
FIG. 10 illustrates two-row honey-comb-like arrangement of the element lens systems according to the present invention.

Such an element lens system comprising three lenses requires at least two adjustments of eccentricity and encounters difficulties in ensuring the accuracy thereof. To overcome this, there is the element lens system according to our co-pending application (Ser. No. 889,404, now abandoned) as shown in FIG. 5. This element lens system uses two lenses having great axial lengths as compared with the effective diameters thereof (hereinafter referred to as bar lenses) and has a field stop 35 provided between the bar lenses 33 and 34 to control the light intensity distribution on the image plane. By this, only one adjustment of eccentricity in the element lens system is required and it becomes easier to ensure the accuracy thereof. Here, the light intensity distribution in the image plane area controlled by the field stop 35 is generally uniform and by superposing this upon the light intensity distribution in the image plane area of an adjacent element lens system, it is intended to provide uniformity, in the slit area, of the exposure amount distribution time-integrated in the original scanning direction. However, this will offer no problem if the arrangement interval between the element lens systems is of a regular value, but if there is an error in such arrangement interval, there will be caused irregularity in quantity of light which will adversely affect the imaging performance. According to the present invention, control is effected not by a field stop but by a lens aperture eclipse so as to provide a predetermined light intensity distribution in the image plane area, and by suitably superposing this light intensity distribution, the uniformity, in the slit area, of the exposure amount distribution time-integrated in the original scanning direction is maintained even if there is an error in the arrangement interval of the element lens systems. FIG. 6 shows a first element lens system according to the present invention. Bar lenses 40 and 41 are coaxial with each other and on the outer diameter portion thereof, there is provided a light absorbing member 42 for controlling the light intensity distribution on the image plane as a stop extending in the direction of the optic axis. A part of the area of the object D forms an intermediate inverted image 43 between the bar lenses 40 and 41 and finally forms an erect one-to-one magnification image on the image plane P. In FIG. 7, there are shown data symbols of the bar lenses 40 and 41. The image forming action of the bar lenses is shown in FIG. 8, in which reference number 44 designates a principal light ray (a ray incident on the center of a first surface). The bar lens 40 is telecentric on the image side and the bar lens 41 is telecentric on the object side and therefore, the principal light ray emergent from the bar lens 40 or incident on the bar lens 41 becomes parallel to the optic axis. Accordingly, the light rays forming the intermediate image is efficiently re-imaged on the image plane by the bar lens 41 without loss of quantity of light. That is, by making the bar lenses 40 and 41 telecentric, the surface of the bar lens 40 which is adjacent to the image side and the surface of the bar lens 41 which is adjacent to the object side act so as to form an air lens (a concave lens whose interior refractive index is smaller than the exterior refractive index thereof is equivalent to an ordinary convex lens) and serve also as the field lens 26 of FIG. 4. However, it should be noted here that the area of the object re-imaged on the plane of projection without loss of quantity of light is in the range of the limited area $\phi_0$ in the central portion, namely, in the range of $\phi_2$ in the area on the intermediate image plane. In this range, the diameter of the entrance pupil is always equal to the outer diameter of the lens and there is no aperture eclipse and uniformity of the light intensity distribution is brought about. Assuming that the inner diameter of the light absorbing member 42 is $\phi_2'$ the light beam from the object area imaged beyond $\phi_2$ on the intermediate image plane and in the area $\phi_2'$ namely, the area corresponding to $\phi_0$ to $\phi_{01}$ on the object surface, is broken by the inner surface of the bodytube of the lens 40, namely, the outer diameter surface of the lens and the inner surface of the intermediate portion of the two lenses, thus causing an aperture eclipse. The degree thereof is increased from $\phi_0$ toward $\phi_{01}$ and at $\phi_{01}$, the aperture eclipse becomes 100%, that is, the light beam regularly transmitted into the plane of projection becomes zero. FIG. 9 shows a cross-section of the light intensity distribution on the image plane at such time. In FIG. 9, the ordinate I represents the light intensity and the abscissa represents the image height (angle of view). Here, $\phi_4$ and $\phi_{41}$ conjugately correspond to $\phi_0$ and $\phi_{01}$, respectively, on the object surface in the plane of projection. Optical systems which can provide such a trapezoid light intensity distribution on the plane of projection are equidistantly arranged into a row of array and if the distribution in the direction of arrangement with respect to the exposure amount time-integrated in a direction perpendicular to the direction of arrangement (namely, in the scanning direction) is examined, it is sine-shaped. Even the sine-shaped intensity distribution is sometimes allowable (the array is not limited to a row but includes a plurality of rows), but if, as shown in FIG. 10, lenses comprising coaxially disposed first lenses 40 and second lenses 41 are arranged in a two-row honey-comb-like fashion (an arrangement in which the second row is offset by a/2 with respect to the first row, where a is the interval or pitch between the projecting optical systems), the distribution, in the direction of arrangement, of the quantity of light integrated in the direction perpendicular to the direction of arrangement, i.e. in the scanning direction, becomes substantially uniform. The arrangement may comprise more rows with the honey-comb-like two rows being as a set. The distance l between the first and the second row is determined in accordance with the slit width.

The uniformity at the above-described time is obtained in the range of several percent when the relation between the pitch a and the effective object view field $\phi_{01}$ satisfies the following condition:

$$K_1 \times \phi_{01}/2 \leq a \leq K_2 \times \phi_{01}/2 (K_1=0.9, K_2=1.1)$$

In this manner, the present embodiment provides an optical system in which the exposure amount distribution integrated in the scanning direction of the projected image is uniformized and in which the number of the lenses in the direction of the optic axis is two and the adjustment thereof is easy.

The exposure amount distributions time-integrated in the original scanning direction are superposed upon one another in the area of each element lens system wherein the light intensity is weak, namely, the skirt area in FIG. 9, and therefore, the uniformity of the exposure amount distributions is never greatly destroyed even if there is an error in the arrangement interval of the element lens systems.

According to the experiment carried out by the inventors, it has been found that a good result can be obtained by using identical lenses as the bar lenses 40 and bar lenses 41 (but making them plane-symmetric with respect to the intermediate image 43) and making the length of each lens along the optic axis two to sixty times as long as the effective diameter of the lens.

As regards the design of these lenses 40 and 41, it is desired that the first lenses 40 satisfy equations (6)–(10) and the second lenses 41 satisfy equations (16)–(20), as will later be described. This will hereinafter be described. Let $r_1$ be the curvature radius of the first surface of the first lens 40, namely, that surface thereof which is adjacent to the object side, $r_2$ be the curvature radius of the second surface of the first lens 40, namely, that surface thereof which is adjacent to the image side (in the drawing, $r_2$ is a negative amount), $d_1'$ be the center thickness of the first lens, namely, the distance between the first and the second surface of the first lens along the optic axis thereof, $n_1'$ be the refractive index of the first lens, $\phi_1$ be the effective diameter of the lens, $\phi_0$ be the size of the object field area transmitted without loss of quantity of light (aperture eclipse), $\phi_2$ be the size of the intermediate image 43, $S_1$ be the distance from the first surface of this lens 40 to the object D (in the drawing, $S_1$ is a negative amount), $S_2'$ be the distance from the second surface of the first lens 40 to the intermediate image 45, $\beta_1$ ($\equiv -|\phi_2/\phi_0|$) be the lateral magnification of the intermediate image 43 with respect to the object D, and Fe be the object side effective F-number. Fe, $S_1$, $\beta_1$, $S_2'$ can be present and from these five set amounts, $\gamma_1$, $\gamma_2$, $d_1'$, $\phi_1$ and $\phi_0$ can be calculated by ideal image formation theory. First, from the definition of F-number, $$Fe = \frac{\sqrt{S_1^2 + \left(\frac{\phi_1}{2}\right)^2}}{\phi_1} \tag{1}$$

Also, from paraxial pursuit $$\beta_1 = \frac{1}{(\phi_1 + \phi_2 - \phi_1 e_1'\phi_2)S_1 + (1 - e_1'\phi_2)} \tag{2}$$

where $\phi_1 = (n_1' - 1)/r_1$ (refractive power of the first surface)
$\phi_2 \equiv (1 - n_1')/r_2$ (refractive power of the second surface)
$e_1' \equiv d_1'/n_1'$.

Next, the condition on which the principal ray of the incident light beam from the object, namely, the light ray passing through the center of the first surface, leaves the second surface and then travels parallel to the optic axis may be expressed by the following relation because of the fact that the focal length of the second surface (i.e. $1/\phi_2$) is just equal to $e_1'$:

$$1/\phi_2 = e_1' \tag{3}$$

Next, as the condition for the light beam incident on the lens 40 from the end of the object field area $\phi_0$ which does not cause aperture eclipse not to be kicked, the following relation is obtained because of the fact that the lower rays of the light beam, after having passed through the first surface, travel along the edge of the lens 40 which is parallel to the optic axis.

$$\phi_1 = -\frac{1}{S_1}\left(1 + \frac{\phi_0}{\phi_1}\right) \tag{4}$$

Finally, the following becomes necessary from the condition for maintaining, in advance, the distance $S_2'$ from the second surface of the first lens 40 to the intermediate image position at a proper value.

$$S_2' = \beta_1 \times \{(1 - \phi_1 e_1')S_1 - e_1'\} \tag{5}$$

By simultaneously solving the conditions (1)–(5) with respect to $r_1$, $r_2$; $d_1'$, $\phi_1$; $\phi_0$, the following result is primarily obtained:

$$\gamma_1 = (n_1' - 1) \times \frac{\beta_1 S_1}{\left[(1 - \beta_1) - \frac{S_2'}{\beta_1 S_1}\right]} \tag{6}$$

$$\gamma_2 = (1 - n_1') \times \beta_1 S_1 \tag{7}$$

$$d_1' = n_1' \times \beta_1 S_1 \tag{8}$$

$$\phi_1 = \frac{-S_1/Fe}{\sqrt{1 - \left(\frac{1}{2Fe}\right)^2}} \tag{9}$$

$$\phi_0 = \left(\frac{\left(\frac{S_2'}{\beta_1}\right) - S_1}{\beta_1 S_1}\right) \times \phi_1 \tag{10}$$

The lens 41 will now be described. Description will be made by again using the symbols shown in FIG. 7.

In the drawing, let $r_3$ be the curvature radius of the first surface of the second lens 41, namely, that surface thereof which is adjacent to the object side, $r_4$ be the curvature of the second surface of the second lens, namely, that surface thereof which is adjacent to the image side (in the drawing, $r_4$ is a negative amount), $d_2'$ be the center thickness of the second lens, namely, the distance between the first and the second surface along the optic axis, and $n_2'$ be the main refractive index of the material of this lens, namely, the refractive index for the typical design wavelength. Also, let $\phi_3$ be the effective diameter of this lens, $\phi_4$ be the size of the projected image on the plane of projection relative to the second lens, $S_3$ be the distance from the first surface of this lens 41 to the intermediate image 43 (in the drawing, $S_3$ is a negative amount), and $S_4'$ be the distance from the second surface of the second lens 41 to the projected image. Further, let $\beta_2 (\equiv -|\phi_4/\phi_2|)$ be the lateral magnification of the final projected image with respect to the intermediate image 43. Let Fe' be the image side effective F-number of this lens 41.

The effective F-number determined by the condition relating to the brightness of the projected image, namely, $$Fe' \equiv \frac{\sqrt{(S_4')^2 + \left(\frac{\phi_3}{2}\right)^2}}{\phi_3}, \quad (11)$$

and the lateral magnification $\beta_2(|\beta_2|>1)$ of the projected image set so that part image may not be kicked, and the intermediate image distance $S_4$ and the lens back $S_4'$ to the plane of projection are amounts which can be preset. Also, the main reflective index $n_2'$ of the material is determined by setting the quality of the material. From these set amounts $Fe'$, $\beta_2$, $S_3$, $S_4'$ and $n_2'$, the curvature radius $r_3$ of the first surface of the second lens 41, the curvature radius $r_4$ of the second surface thereof, the center thickness $d_2'$ of the second lens, the effective diameter $\phi_3$ of the second lens and the effective part diameter $\phi_4$ of the projected image are determined by using the ideal image formation theory and from the following conditions.

First, the relation between the lateral magnification $\beta_2$ and the construction data of the lens 41 is given by the following equation.

$$\frac{1}{\beta_2} = \frac{1}{\{\phi_2 + \phi_4 - \phi_3 e_2' \phi_4\}(-S_4') + \{1 - e_2'\phi_3\}} \quad (12)$$

where $\phi_3 \equiv (n_2'-1)/r_3$ (refractive power of the first surface)

$\phi_4 \equiv (1-n_2')/r_4$ (refractive power of the second surface)

$e_2' \equiv d_2'/n_2'$.

In order that the incident light beam having its main optic axis parallel to the optic axis may pass through the second lens without excess and deficiency with respect to the effective diameter of the second lens, it is desirable that the exit pupil lie on the second surface of the second lens. This requirement leads to obtainment of the following relation because of the fact that the focal length of the first surface (i.e. $1/\phi_3$) is just equal to $e_2'$.

$$1/\phi_3 = e_2' \quad (13)$$

Next, as the condition for the light beam incident from the end of the effective intermediate image diameter $\phi_2$ onto the second lens 41 not to be kicked, the following relation is obtained because of the fact that the lower rays of the light beam, after having passed through the first surface, travel along the edge of the lens 41 which is parallel to the optic axis.

$$\phi_4 = \frac{1}{S_4'}\left(1 + \frac{\phi_4}{\phi_3}\right) \quad (14)$$

Finally, from the condition for maintaining, in advance, the distance from the first surface of the second lens 41 to the intermediate image position at a proper value, the following relation becomes necessary:

$$S_3 = 1/\beta_2 \times \{(1-\phi_4 e_2')S_4' + e_2'\} \quad (15)$$

By simultaneous solving the equations (1)–(5) with respect to $r_3$, $r_4$ $d^2$, $\phi_3$ and $\phi_4$, the following result is primarily obtained.

$$r_3 = (1 - n_2') \times \frac{S_4'}{\beta_2} \quad (16)$$

$$r_4 = (n_2' - 1) \times \frac{S_4'/\beta_2}{\left[\left(1 - \frac{1}{\beta_2}\right) - \frac{S_3\beta_2}{S_4'}\right]} \quad (17)$$

$$d_2' = n_2' \times S_4'/\beta_2 \quad (18)$$

$$\phi_3 = \frac{S_4'/Fe'}{\sqrt{1 - \left(\frac{1}{2Fe'}\right)^2}} \quad (19)$$

$$\phi_4 = \left[\frac{S_3\beta_2 - S_4'}{S_4'/\beta_2}\right] \times \phi_3 \quad (20)$$

Thus, in the coaxial optical system comprising a combination of the first lens 40 and the second lens 41, an intermediate image (having an image diameter of $\phi_2$) of the object to be projected (having a diameter of $\phi_0$) is first formed by the first lens and subsequently, this intermediate image is relayed by the second lens onto the plane of projection as an erect image having a projected image diameter $\phi_4$ without losing the uniformity of brightness. In that case, care must be taken of the fact that in order to form the image of the entire object surface on the plane of projection without condition by arranging a plurality of coaxial optical systems each comprising the first lens and the second lens, the optical systems must generally be used at $\beta_1 \times \beta_2 = +1$, i.e. one-to-one magnification. That is, the first and second lenses must be arranged so as to satisfy the relation that $$\beta_2 = 1/\beta_1 \quad (21)$$

In such a case, it is necessarily self-evident that $$Fe' = Fe \quad (22)$$

After all, assuming that in a coaxial optical system of erect one-to-one magnification comprising a combination of the first lens 40 and the second lens 41, $\beta_1$ and $Fe$ of the first lens 40 are set by proper conditions, $\beta_2$ and $Fe'$ of the second lens are naturally determined by equations (21) and (22). However, attention must be paid to the fact that $S_1$, $S_2$, and $n_1$, which are the other set values of the first lens and $S_3$, $S_4'$ and $n_2'$ which are the set values of the second lens may be independently determined from proper conditions.

Now, the difference in construction between the first lens and the second lens generally leads to making of two types of lenses and this should desirably be avoided from the view point of manufacture.

From this point of view, a coaxial optical system in which the first lens is disposed symmetrically with respect to the intermediate image plane will immediately occur to mind as the second lens of the aforementioned coaxial optical system of erect one-to-one magnification comprising a combination of the first lens and the second lens which satisifies conditions (21) and (22). Thus, if based on this conception, it becomes possible to divert the first lens as the second lens. In this case, the various elements constituting the second lens may be obtained in the following relationship with the various elements constituting the first lens:

$r_3 = -r_2, r_4 = -r_1, d_2' = d_1', n_2' = n_1', \phi_3 = \phi_1,$ $\phi_4 = \phi_0, \beta_2 = 1/\beta_1, S_3 = -S_2', S_4' = -S_1, Fe' = Fe$ By this, the projecting optical system is made simple.

By actual designing, the inventors have confirmed that the first lens and the second lens may be of the order of ±10% from previous conditions (6)–(10) and (16)–(20), namely, of the order expressed as follows:

$$K_1 \times (n_1' - 1) \times \frac{\beta_1 S_1}{\left[(1 - \beta_1) - \frac{S_2'}{\beta_1 S_1}\right]} \leq r_1 \leq K_2 \times$$

$$(n_1' - 1) \times \frac{\beta_1 S_1}{\left[(1 - \beta_1) - \frac{S_2'}{\beta_1 S_1}\right]}$$

$$K_1 \times (1 - n_1') \times \beta_1 S_1 \geq r_2 \geq K_2 \times (1 - n_1') \times \beta_1 S_1$$

$$K_1 \times n_1' \times \beta_1 S_1 \leq d_1' \leq K_2 \times n_1' \times \beta_1 S_1$$

$$K_1 \times \frac{-S_1/Fe}{\sqrt{1 - \left(\frac{1}{2Fe}\right)^2}} \leq \phi_1 \leq K_2 \times \frac{-S_1/Fe}{\sqrt{1 - \left(\frac{1}{2Fe}\right)^2}}$$

$$K_1 \times \left[\frac{\left(\frac{S_2'}{\beta_1}\right) - S_1}{\beta_1 S_1}\right] \times$$

$$\phi_1 \leq \phi_0 \leq K_2 \times \left[\frac{\left(\frac{S_2'}{\beta_1}\right) - S_1}{\beta_1 S_1}\right] \times \phi_1$$

$$(1 - n_2') \times \frac{S_4'}{\beta_2} \times K_1 \leq r_3 \leq K_2 \times (1 - n_2') \times \frac{S_4'}{\beta_2}$$

$$K_1 \times (n_2' - 1) \times \frac{S_4'/\beta_2}{\left[\left(1 - \frac{1}{\beta_2}\right) - \frac{S_3 \times \beta_2}{S_4'}\right]} \geq$$

$$r_4 \geq K_2 \times (n_2' - 1) \times \frac{S_4'/\beta_2}{\left[\left(1 - \frac{1}{\beta_2}\right) - \frac{S_2 \times \beta_2}{S_4'}\right]}$$

$-n_2' \times S_4'/\beta_2 \times K \leq d_2' \leq K_2 \times (-n_2') \times S_4'/\beta_2$ $$\frac{S_4'/Fe'}{\sqrt{1 - \left(\frac{1}{2Fe'}\right)^2}} \times K_1 \leq \phi_3 \leq \frac{S_4'/Fe'}{\sqrt{1 - \left(\frac{1}{2Fe'}\right)^2}} \times K_2$$

$$\left[\frac{S_3\beta_2 - S_4'}{S_4'/\beta_2}\right] \times$$

-continued $$\phi_3 \times K_1 \leq \phi_4 \leq \left[\frac{S_3\beta_2 - S_4'}{S_4'/\beta_2}\right] \times \phi_3 \times K_2$$

where $K_1=0.9$ and $K_2=1.1$. With these conditions taken into consideration, six types of data are shown in Table I. The unit is mm.

TABLE I

| | $\phi_0,\phi_4$ | $\phi_{01},\phi_{42}$ | $\phi_1,\phi_3$ | $S_2',S_3$ | $S_1,S_4'$ | $\beta_1, \frac{1}{\beta_2}$ | $n_1',n_2$ | Material | $r_1$ | $r_2$ | $r_3$ | $r_4$ | $d_1',d_2'$ | a (pitch) |
|---|---|---|---|---|---|---|---|---|---|---|---|---|---|---|
| 1 | 2 | 3.7 | 1.3 | 3.4 | −21. | −0.35 | 1.491 | Acryl | 4. | −3.7 | 3.7 | −4 | 11. | 1.68–2.04 |
| 2 | 2.6 | 3.7 | 1.4 | 2.4 | −21. | −0.375 | 1.491 | Acryl | 3.61 | −3.87 | 3.87 | −3.61 | 12.1 | 1.68–2.04 |
| 3 | 1.34 | 5.2 | 1.58 | 4.86 | −21. | −0.3 | 1.491 | Acryl | 5.85 | −3.1 | 3.1 | −5.86 | 9.7 | 1.8–2.2 |
| 4 | 2 | 3.7 | 1.3 | 3.4 | −21. | −0.35 | 1.51633 | BK7 | 4.206 | −3.89 | 3.89 | −4.206 | 11. | 1.68–2.04 |
| 5 | 2.6 | 3.7 | 1.4 | 2.4 | −21. | −0.375 | 1.491 | Acryl | 3.796 | −4.07 | 4.07 | −3.796 | 12.1 | 1.68–2.04 |
| 6 | 1.34 | 5.2 | 1.58 | 4.86 | −21. | −0.3 | 1.491 | Acryl | 6.15 | −3.26 | 3.26 | −6.15 | 9.7 | 1.8–2.2 |

Figure 11:
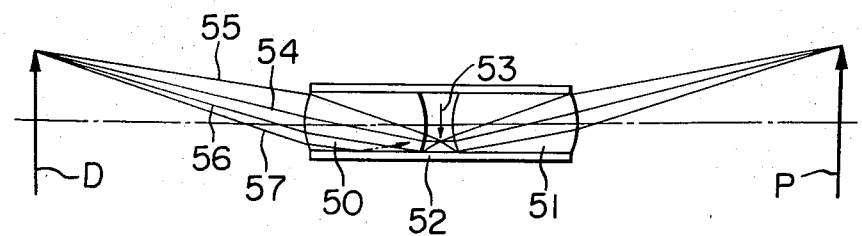
FIG. 11 illustrates a second element lens system according to the present invention.
Figure 12:
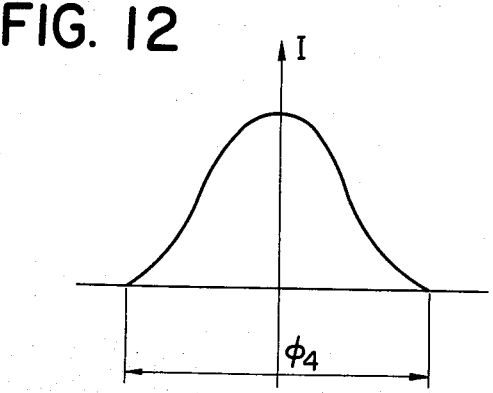
FIG. 12 is a cross-sectional view of the light intensity distribution on the plane of projection of the second element lens system.

The second element lens system according to the present invention will now be described by reference to FIGS. 11 and 12. In this element lens system, the light intensity distribution on the image plane thereof is controlled by the lens aperture eclipse as in the first element lens system so as to be the gaussian light intensity distribution as shown in FIG. 12 and by superposing the shirt portion thereof, uniformity of the exposure amount time-integrated in the original scanning direction is achieved. The second element lens system differs in lens data from the first element lens system and by reducing the lateral magnification and making the angle of view of the lens wider, the view field is superposed several times over to achieve uniformity of the exposure amount distribution and further allow the error of the arrangement internal of the element lens system. In FIG. 11, an intermediate image 53 is formed between the first bar lens 50 and the second bar lens 51.

Now, the principal ray 54 will be described. When the light ray 55 incident from the end of the effective object field onto the upper end of the first surface of the bar lens 50 and the light ray 56 passing from the end of the effective object field through the lower end of the second surface of the bar lens 50 are considered, the light ray emergent from just the middle of the heights at which the rays 55 and 56 emerge from the second surface and travelling parallel to the optic axis toward the bar lens 51, namely, the center of the emergent light beam, is defined as the principal ray. The bar lens 50 is telecentric on the image side and the bar lens 51 is telecentric on the image side. The incident ray 57 further lower than the ray 56 passes through the first surface of the bar lens 50, whereafter it is attenuated by a light absorbing member 52 and finally, the light intensity distribution on the image plane becomes a gaussian distribution. Such element lens systems are substantially equidistantly arranged in the direction of the slit and when the following condition is satisfied, uniformity in several percent is obtained as the exposure amount distribution. Here, a is the arrangement interval.

$L_1 \times \phi_1 < a < L_2 \times \phi_1 (L_1 = 1.18, L_2 = 1.36)$

The various elements of the bar lenses 50 and 51 will be quantitatively described by using the same lens symbols as those mentioned previously.

From the definition of the F-number, $$Fe = \frac{\sqrt{S_1^2 + \left(\frac{\phi_1}{2}\right)^2}}{\phi_1} \quad (22)$$

also, from paraxial pursuit, $$\beta_1 = \frac{1}{(\phi_1 + \phi_2 - \phi_1 e_1'\phi_2)S_1 + (1 - e_1'\phi_2)} \quad (23)$$

where $\phi_1 \equiv n_1' - 1/r_1$ (refractive power of the first surface)
$\phi_2 \equiv 1 - n_1'/r_2$ (refractive power of the second surface)
$e_1^1 \equiv d_1'/n_1'$.

Next, the following relation is shown from the condition on which the principal ray of the effective incident light beam from the object, after having left the second surface, emerges parallel to the optic axis.

$$\phi_2 = 2/e_1' \quad (24)$$

$$\phi_1 = -1/S_1 \quad (25)$$

Also, from the condition on which the opening efficiency at the maximum required angle of view is zero, the following relation becomes necessary:

$$\phi_0 = (-2 \times S_1 \times \phi_1)/e_1' \quad (26)$$

Finally, from the condition for maintaining, in advance, the distance $S_2'$ from the second surface of the first bar lens 50 to the intermediate image position at a proper value, the following relation becomes necessary:

$$S_2' = 1/\phi_2 \quad (27)$$

By solving the conditions of equations (22)–(27) with respect to $r_1$, $r_2$, $d_1'$, $\phi_1$ and $\phi_0$, the following result is primarily obtained:

$$r_1 = -(n_1' - 1)S_1 \quad (28)$$

$$r_2 = S_1 \times \beta_1 \times (1 - n_1') \quad (29)$$

$$d_1' = 2 \times n_1' \times S_1 \times \beta_1 \quad (30)$$

$$\phi_1 = \frac{-S_1/Fe}{\sqrt{1 - \left(\frac{1}{2Fe}\right)^2}} \quad (31)$$

$$\phi_0 = -\frac{\phi_1}{\beta_1} \quad (32)$$

The second bar lens 51 will now be described.
The effective F-number determined from the condition relating to the brightness of the projected image is expressed by the following equation.

$$Fe' = \frac{\sqrt{(S_4')^2 + \left(\frac{\phi_3}{2}\right)^2}}{\phi_3} \quad (33)$$

Also, the relation between the lateral magnification $\beta_2$ and the construction data of the second bar lens 51 is given by the following equation:

$$\frac{1}{\beta_2} = \frac{1}{(\phi_3 + \phi_4 - \phi_3 e_2'\phi_4)(-S_4') + (1 - e_2'\phi_3)} \quad (34)$$

where $\phi_3 \equiv n_2' - 1/r_3$ (refractive power of the first surface)
$\phi_4 \equiv 1 - n_2'/r_4$ (refractive power of the second surface)
$e_2' \equiv d_2'/n_2'$.

Next, from the condition on which the principal ray of the effective incident light beam from the object is parallel to the optic axis when it is incident on the first surface of the second bar lens 51, the following equations are obtained:

$$\phi_3 = 2/e_2' \quad (35)$$

$$\phi_4 = 1/S_4' \quad (36)$$

Also, from the condition on which the opening efficiency is zero at the maximum required angle of view, the following relation becomes necessary:

$$\phi_4 = (2 \times S_4' \times \phi_3)/e_2' \quad (37)$$

Finally, from the condition for maintaining, in advance, the distance $S_3$ from the first surface of the second bar lens 51 to the intermediate image position at a proper value, the following relation becomes necessary:

$$S_3 = -1/\phi_3 \quad (38)$$

By simultaneously solving the conditions of equations (33)–(38) with respect to $r_3$, $r_4$, $d_2'$, $\phi_3$ and $\phi_4$, the following result is primarily obtained.

$$r_3 = S_4' \times \frac{1}{\beta_2} \times (1 - n_2') \quad (39)$$

$$r_4 = (1 - n_2') \times S_4' \quad (40)$$

$$d_1' = -2 \times n_2' \times S_4' \times \frac{1}{\beta_2} \quad (41)$$

$$\phi_3 = \frac{S_4'/Fe'}{\sqrt{1 - \left(\frac{1}{2Fe'}\right)^2}} \quad (42)$$

$$\phi_4 = -\beta_2 \times \phi_3 \quad (43)$$

Also, because of the fact that the present lens system is a system of erect one-to-one magnification, $$\beta_2 = 1/\beta_1 \quad (44)$$

In such an arrangement, the following equation is necessarily self-evident.

$$Fe' = Fe \quad (45)$$

Now, as described with respect to the first element lens system, the optical system symmetric with respect to the intermediate image plane enables the first bar lens 50 to be diverted as the second bar lens 51. In this case, the various elements constituting the second bar lens 51 are coupled to the various elements constituting the first bar lens 50 by the following relations:

$$r_3 = -r_2, r_4 = -r_1, d_2' = d_1', n_2' = n_1', \phi_3 = \phi_1,$$

$$\phi_4 = \phi_0, \beta_2 = 1/\beta_1, S_3 = -S_2', S_4' = -S_1, Fe' = Fe$$

By this, the projecting optical system is made simple.

Further, by experimental designing, the inventors have confirmed that the first lens and the second lens may be of the order of ±10% from the previous conditions (28)-(32) and (39)-(43). That is:

$$-K_1 \times S_1 \times (n_1' - 1) \leq r_1 \leq -K_2 \times S_1 \times (n_1' - 1)$$

$$K_2 \times S_1 \times \beta_1 \times (1 - n_1') \leq r_2 \leq K_1 \times S_1 \times \beta_1 \times (1 - n_1')$$

$$2 \times K_1 \times n_1' \times S_1 \times \beta_1 \leq d_1' \leq 2 \times K_2 \times n_1' \times S_1 \times \beta_1$$

$$K_1 \times \frac{-S_1/Fe}{\sqrt{1 - \left(\frac{1}{2Fe}\right)^2}} \leq \phi_1 \leq K_2 \times \frac{-S_1/Fe}{\sqrt{1 - \left(\frac{1}{2Fe}\right)^2}}$$

$$-K_1 \times \frac{\phi_1}{\beta_1} \leq \phi_0 \leq -K_2 \times \frac{\phi_1}{\beta_1}$$

$$K_1 \times S_4' \times \frac{1}{\beta_2} \times (1 - n_2') \leq r_3 \leq K_2 \times S_4' \times \frac{1}{\beta_2} \times (1 - n_2')$$

$$K_2 \times S_4' \times (1 - n_2') \leq r_4 \leq K_1 \times S_4' \times (1 - n_2')$$

$$-2 \times K_1 \times n_2' \times S_4' \times \frac{1}{\beta_2} \leq d_2' \leq -2 \times K_2 \times n_2' \times S_4' \times \frac{1}{\beta_2}$$

$$K_1 \times \frac{S_4'/Fe'}{\sqrt{1 - \left(\frac{1}{2Fe'}\right)^2}} \leq \phi_3 \leq K_2 \times \frac{S_4'/Fe'}{\sqrt{1 - \left(\frac{1}{2Fe'}\right)^2}}$$

$$-K_1 \times \beta_2 \times \phi_3 \leq \phi_4 \leq -K_2 \times \beta_2 \times \phi_3$$

where $K_1 = 0.9$ and $K_2 = 1.1$

With these conditions taken into consideration, six types of data are shown in Table II. The unit is mm.

TABLE II

| | $\phi_0, \phi_4$ | $\phi_1, \phi_3$ | $S_2', -S_3$ | $S_1, -S_4'$ | $\beta_1, \frac{1}{\beta_2}$ | $n_1', n_2'$ | Material | $r_1$ | $r_2$ | $r_3$ | $r_4$ | $d_1', d_2'$ | a (pitch) |
|---|---|---|---|---|---|---|---|---|---|---|---|---|---|
| 1 | 5.6 | 1.1 | 4.6 | −23.5 | −0.2 | 1.491 | Acryl | 11.54 | −2.27 | 2.27 | −11.54 | 13.8 | 1.3-1.5 |
| 2 | 6.2 | 1.1 | 5.2 | −29.5 | −0.18 | 1.491 | Acryl | 14.49 | −2.57 | 2.57 | −14.49 | 15.6 | 1.3-1.5 |
| 3 | 4 | 1.1 | 5.1 | −18.4 | −0.28 | 1.491 | Acryl | 9.03 | −2.48 | 2.48 | −9.03 | 15.1 | 1.2-1.4 |
| 4 | 5.6 | 1.1 | 4.6 | −23.5 | −0.2 | 1.5163 | BK7 | 11.74 | −2.3 | 2.3 | −11.74 | 13.8 | 1.3-1.5 |
| 5 | 6.2 | 1.1 | 5.2 | −29.5 | −0.18 | 1.5163 | BK7 | 14.74 | −2.61 | 2.61 | −14.74 | 15.6 | 1.3-1.5 |
| 6 | 4 | 1.1 | 5.1 | −18.4 | −0.28 | 1.5163 | BK7 | 9.5 | −2.52 | 2.52 | −9.5 | 15.1 | 1.2-1.4 |

Figure 13:
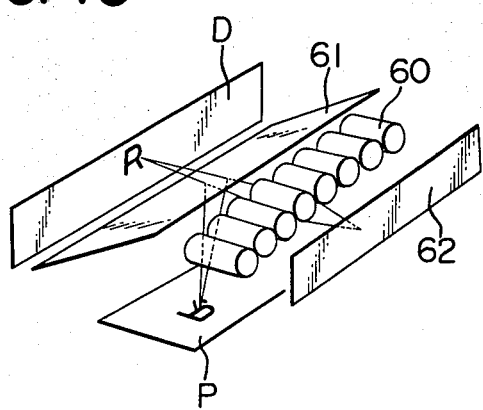
FIG. 13 illustrates a reflection type third element lens system.

Now, by providing a mirror in the intermediate image plane of the first and second element lens systems symmetric with respect to the intermediate image plane, there may be provided a reflection type third element lens system as shown in FIG. 13. The lens data of each single bar lens 60 of the third element lens system are identical to those of the first and second transmission type element lens systems.

The light from the object D passes through a half-mirror 61 and through a bar lens 60 and forms an intermediate image on a mirror 62, from which the light travels back and again passes through the bar lens 60 and is reflected by the half-mirror 61 to finally form an erect one-to-one magnification image on the image plane P.

Figure 16:
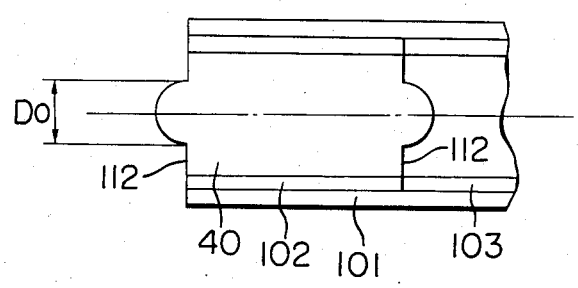

Reference is now had to FIGS. 14 to 16 to describe the light absorbing member according to the present invention.

In the present invention, the light absorbing member is provided on the outer diameter portion of the bar lens and by using this as a diaphragm extending in the direction of the optic axis, the light intensity distribution on the image plane is controlled by lens aperture eclipse. Thus, it is necessary that the light incident onto the bar lens from the other portion than the effective object field $\phi_0$ be not transmitted to the image plane as stray light. An embodiment of the light absorbing member of a system using a lens tube as the bar lens holding member will be described with reference to FIGS. 14 and 15(A) and (B). Blackening the outer diameter surface of the lens with Chinese ink as a substitute for the light absorbing member is not suitable in that the Chinese ink is worn off when the bar lens fits in the bodytube. This is because, in the present invention, an anti-reflection measure stable in a long range of the direction of the optic axis is desired in order to control the light intensity distribution on the image plane by lens aperture eclipse. By the way, if the lens tube is used also as the light absorbing member, the internal reflection on the inner diameter surface of the lens tube cannot be prevented and some consideration is necessary.

In FIG. 14(A), a light absorbing member 102 having substantially the same refractive index as that of the bar lens is inserted between the outer diameter surface of bar lenses 90,91 and the inner diameter surface of the lens tube 101, and a light absorbing member 103 identical in effect to the light absorbing member 102 is inserted intermediate the bar lenses 90 and 91. If the inner diameter of the light absorbing member 103 is equal to that of the light absorbing member 102, these light absorbing members 102 and 103 can be made integral with each other. Ideally, however, the light absorbing member 103 should desirably have a refractive index approximate to that of air in order to prevent internal reflection. If the light absorbing member 103 has no refractive index, internal reflection would be zero. As regards the materials of the bar lenses 90,91 and the light absorbing member 102, the bar lenses 90,91 may be formed of transparent plastics, for example, and the light absorbing member 102 may be formed of black plastics. Light is attenuated and absorbed in black plastics. FIG. 14(B) shows a system in which the bodytube serves also as an integral light absorbing member. That is, bar lenses 90, 91 formed of transparent plastics are fitted into a bodytube 101a formed of black plastics to substantially null the internal reflection in the outer diameter portion of the bar lenses and the inner diameter portion of the bodytube.

Reference is now had to FIGS. 15(A) and (B) to further describe the function of the light absorbing members. In FIG. 15(A), the light ray 104 incident onto the first surface of the bar lens 90 from the other area than the effective object field reaches the boundary between the bar lens 90 and the light absorbing member 102. Since the refractive index of the bar lens 90 is substantially equal to that of the light absorbing member, the light 105 reflected by the boundary is very little and the light passes through the boundary to the light absorbing member 102. The light absorbing member 102 is of a material which attenuates the incident light due to light absorption and diffusion, and the light 106 passing through the light absorbing member 102 and reflected by the boundary between the member 102 and the lens tube and again incident on the bar lens 90 or the light 107 passing to the lens tube 101 becomes null. The light absorbing member itself has the effect of intercepting extraneous stray light, and the lens tube should further desirably be black in order to serve also as means for preventing extraneous stray light. Also, as shown in FIG. 15(B), it is necessary that the light ray 108 passing through the second surface of the bar lens 90 and then incident on the light absorbing member 103 do not produce unnecessary light rays 109, 110 and 111. In particular, the elimination of the light 109 is important because, if such light is obliquely incident, the quantity of reflected light will be increased. Originally, the refractive index of the light absorbing member 103 may suitably be approximate to that of air, but there will actually be no problem even if the light absorbing member 103 is formed of the same material as the light absorbing member 102.

The inner diameter of the light absorbing member 103 may be equal to or greater than the outer diameter of the lens. That is, the light absorbing member 103 will suffice it almost completely absorbs and attenuates the light that reaches the bodytube beyond the outer diameter area of the bar lenses. The material of the lenses may be plastics such as acrylic resin or styrol, or glass or the like, and the clad material of the light absorbing layer may be colored plastics or the like. Preferably, a static electricity preventing agent may be mixed with or applied to these materials to prevent adherence of dust or the like thereto. The lens effective diameter has been described as being equal to the lens outer diameter, but even if the lens effective diameter Do apparently differs from the lens outer diameter, as shown in FIG. 16, there will be no convenience if they are substantially equal to each other. As shown in FIG. 16, the other portion 112 of the first and second surfaces of the lens than the effective diameter Do provides a coarse surface or a light absorbing surface and such portion need not act as a lens. Light rays which go beyond the lens effective diameter are absorbed and attenuated by the light absorbing members.

Figure 17:
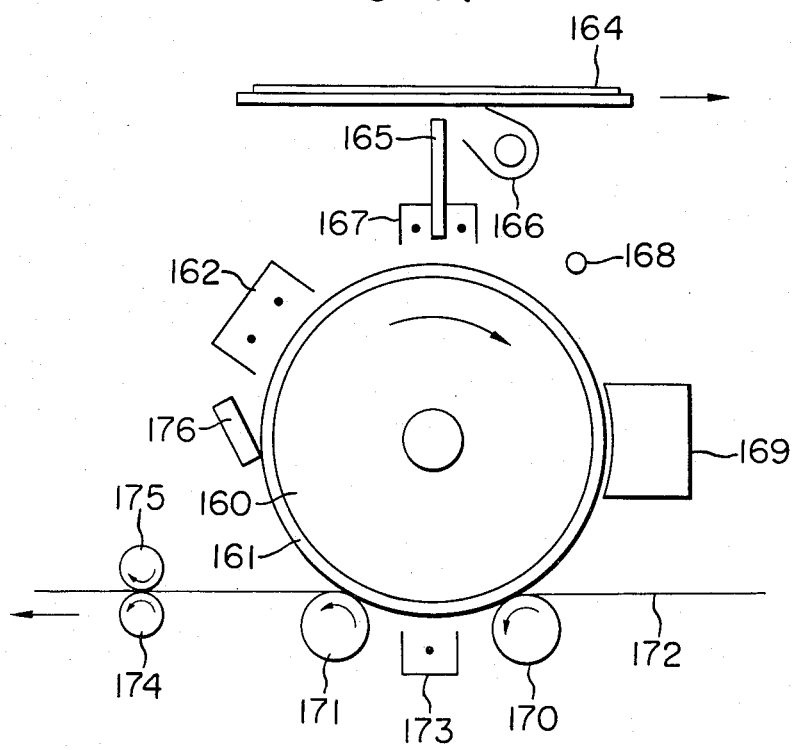
FIG. 17 illustrates the processes of a copying machine to which the present invention is applied.

Now, FIG. 17 shows an embodiment of the copying apparatus to which the projection device of the present invention is applied. Designated by 160 is a drum rotatively driven at a constant velocity in the direction of arrow by a motor, not shown. The drum 160 has on the periphery thereof a photosensitive medium 161 comprising an electrically conductive substrate layer, a photoconductive layer and a transparent insulating surface layer. This photosensitive medium 161 is first subjected to uniform charge by a corona discharger 162. The polarity of such charge is positive if the photoconductor is N type semiconductor, and negative if the photoconductor is P type semiconductor. Subsequently, the photosensitive medium 161 is exposed to the image of an original 164 resting on a transparent original carriage 163 which is moved in the direction of arrow at the peripheral velocity of the drum 160 multiplied by the inverse number of the image formation magnification (in case of the formation of a one-to-one magnification image, at the velocity equal to the peripheral velocity of the drum). This image is formed on the photosensitive medium 161 by a projection lens array 165. The area of the original 164 to which the array 165 is opposed, namely, the area of the original which is to be imaged on the photosensitive medium 161, is illuminated by an illuminating system 166 comprising a lamp and reflector. Here, if the quantity of illuminating light is adjusted, the amount of exposure to the photosensitive medium 161 can be adjusted.

Simultaneously with the application of the image exposure by the array 165, the photosensitive medium 161 is subjected to the discharging action by a corona discharge 167 which is opposite in polarity to the AC corona discharger 162, whereby a charge pattern corresponding to the image of the original 164 is formed on the photosensitive medium 161. Further, the whole surface of the photosensitive medium 161 is uniformly exposed to light from a lamp 168 to thereby form an electrostatic latent image of good contrast thereon. The latent image so formed is developed into a toner image by a cascade type or a magnet brush type developing device 169. Subsequently, this toner image is transferred to transfer paper 172 which is fed from supply means, not shown, and transported at a velocity equal to that of the photosensitive medium 161 by rollers 170, 171 while being brought into contact with the photosensitive medium 161. In order to enhance the transfer efficiency, a charge opposite in polarity to the toner forming the developed image is applied to the back side of the transfer paper 172 at the transfer station. This is accomplished by a corona discharger 173. The toner image transferred to the transfer paper 172 is fixed by a suitable fixing device such as a heating-fixing device provided with a pair of rollers 174, 175 urged against the transfer paper, and then the transfer paper is conveyed into container means, not shown.

After completion of the image transfer, the surface of the photosensitive medium is cleaned by the edge of an elastic blade 176 urged thereagainst to remove any residual toner from that surface, thus becoming ready for another cycle of the above-described image processing. The discharge 167 is installed so as to discharge the surface of the photosensitive medium 161 simultaneously with the application of the light image, but alternatively, it may be disposed between the charger 162 and the image forming system to discharge the surface of the photosensitive medium 161 prior to the application of the light image. In such case, the lamp 168 is unnecessary. Also, the photosensitive medium 161 may be one having no insulating surface layer. In this case, the discharger 167 and lamp 168 are not necessary.

According to the present invention, as has hitherto been described, a compact projection device which allows an error in the arrangement interval of the element lens systems.

What we claim is:
1. A projection device comprising:
   a pair of bar lenses having a greater length in the direction of the optical axis thereof as compared with the effective diameter thereof, said bar lenses controlling, by aperture eclipse, the light intensity distribution over a predetermined partial area on an image plane corresponding to a partial area of an object, said light intensity distribution being weaker in light intensity in the marginal area thereof than in at least the central area thereof; and a holding means connecting said pair of bar lenses and which attenuates and extinguishes unnecessary light rays which reach the portion of said bar lenses other than the effective diameter areas thereof, wherein said pair of bar lenses satisfy the following lens equations:

for the first bar lens:

$$K_1 \times (n_1' - 1) \times \frac{\beta_1 S_1}{(1 - \beta_1) - \frac{S_2'}{\beta_1 S_1}} \leq r_1 \leq K_2 \times (n_1' - 1) \times$$

$$\frac{\beta_1 S_1}{(1 - \beta_1) - \frac{S_2'}{\beta_1 S_1}} K_2 \times (1 - n_2') \times \beta_1 S_1 \leq r_2 \leq K_1 \times$$

$$(1 - n_1') \times \beta_1 S_1 \, K_1 \times n_1' \times \beta_1 S_1 \leq d_1' \leq K_2 \times n_1' \times$$

$$\beta_1 S_1 \, K_1 \times \frac{-S_1/Fe}{\sqrt{1 - \left(\frac{1}{2Fe}\right)^2}} \leq \phi_1 \leq K_2 \times$$

$$\frac{-S_1/Fe}{\sqrt{1 - \left(\frac{1}{2Fe}\right)^2}} K_1 \times \phi_1 \times \frac{\left(\frac{S_2'}{\beta_1}\right) - S_1}{\beta_1 S_1} \leq$$

$$\phi_0 \leq K_2 \times \phi_1 \times \frac{\left(\frac{S_2'}{\beta_1}\right) - S_1}{\beta_1 S_1} \quad K_1 = 0.9, K_2 = 1.1$$

where $r_1$ and $r_2$ represent the curvature radii of the object side surface and the image side surface of the first bar lens, $d_1'$ represents the thickness of the lens on the optic axis thereof, $\phi_1$ represents the effective diameter of the lens, $\phi_0$ represents the size of the object, $n_1'$ represents the refractive index for design wavelength, $\beta_1$ represents the lateral magnification, $S_1$ represents the distance from the object side surface to the object surface along the optic axis, $S_2'$ represents the distance from the image side surface to the intermediate image plane along the optic axis, and Fe represents the object side effective F-number;

for the second bar lens:

$$K_1 \times (1 - n_2') \times \frac{S_4'}{\beta_2} \leq r_3 \leq K_2 \times (1 - n_2') \times \frac{S_4'}{\beta_2} K_2 \times$$

$$(n_2' - 1) \times \frac{S_4'/\beta_2}{1 - \left(\frac{1}{\beta_2}\right) - \frac{S_3 \times \beta_2}{S_4}} \leq r_4 \leq K_1 \times$$

$$(n_2' - 1) \times \frac{S_4'/\beta_2}{\left(1 - \frac{1}{\beta_2}\right) - \frac{S_3 \times \beta_2}{S_4'}} K_1 \times (-n_2') \times$$

$$S_4'/\beta_2 \leq d_2' \leq K_2 \times (n_2') \times S_4'/\beta_2 \, K_1 \times \frac{S_4'/Fe'}{\sqrt{1 - \left(\frac{1}{2Fe'}\right)^2}}$$

$$\leq \phi_3 \leq K_2 \times \frac{S_4'/Fe'}{\sqrt{1 - \left(\frac{1}{2Fe'}\right)^2}} K_1 \times \phi_3 \times$$

$$\frac{S_3\beta_2 - S_4'}{S_4'/\beta_2} \leq \phi_4 \leq K_2 \times \phi_3 \times \frac{S_3\beta_2 - S_4'}{S_4'/\beta_2} \quad K_1 = 0.9, K_2 = 1.1$$

where $r_3$ and $r_4$ represent the curvature radii of the object side surface and the image side surface of the second bar lens, $d_2'$ represents the thickness of the lens on the optic axis, $\phi_3$ represents the effective diameter of the lens, $\phi_4$ represents the size of the projected image, $n_2'$ represents the refractive index for design wavelength, $\beta_2$ represents the lateral magnification, $S_3$ represents the distance from the object side surface to the intermediate image plane along the optic axis, $S_4'$ represents the distance from the image side surface to the projected image plane along the optic axis, and Fe' represents the image side effective F-number.

2. A projection device comprising:
a plurality of element lens systems each comprising a pair of bar lenses having a greater length in the direction of the optical axis thereof as compared with the effective diameter thereof, each pair of bar lenses controlling, by aperture eclipse, the light intensity distribution over a predetermined partial area on an image plane corresponding to a partial area of an object, said light intensity distribution being weaker in light intensity in the marginal area thereof than in at least the central area thereof, said plurality of element lens systems being substantially equidistantly arranged with a predetermined pitch in a predetermined direction in a plane perpendicular to the optical axis so that the light intensity distributions are superposed upon one another in at least said marginal areas to be substantially uniform in the exposure amount distributions even if there is an error in the arrangement interval of the element lens systems; and
a light absorbing member associated with each element lens system for attenuating and extinguishing unnecessary light rays which reach the portion of the associated bar lens system other than the effective diameter area thereof.

3. The projection device according to claim 2, wherein said element lens systems are arranged in a plurality of rows in a predetermined direction in a plane perpendicular to the optical axis so that each row is shifted a half pitch with its adjacent row.

4. A projection device comprising:
a plurality of element lens systems each comprising a pair of bar lenses having a greater length in the direction of the optical axis thereof as compared with the effective diameter thereof, wherein each of said element lens systems is a transmission type erect one-to-one magnification system comprising a first and a second bar lens, each pair of bar lenses controlling, by aperture eclipse, the light intensity distribution over a predetermined partial area on an image plane corresponding to a partial area of an object, said light intensity distribution being weaker in light intensity in the marginal area thereof than in at least the central area thereof, said plurality of element lens systems being substantially equidistantly arranged with a predetermined pitch in a predetermined direction in a plane perpendicular to the optical axis so that the light intensity distributions are superposed upon one another in at least said marginal areas to be substantially uniform in the exposure amount distributions even if there is an error in the arrangement interval of the element lens systems; and
a light absorbing member associated with each element lens system for attenuating and extinguishing unnecessary light rays which reach the portion of the associated element lens system other than the effective diameter area thereof.

5. The projection device according to claim 4, wherein said first and second bar lenses satisfy the following lens equations:

for the first bar lens:

$$K_1 \times (n_1' - 1) \times \frac{\beta_1 S_1}{(1 - \beta_1) - \frac{S_2'}{\beta_1 S_1}} \leq r_1 \leq K_2 \times (n_1' - 1) \times$$

$$\frac{\beta_1 S_1}{(1 - \beta_1) - \frac{S_2'}{\beta_1 S_1}}$$

$$K_2 \times (1 - n_2') \times \beta_1 S_1 \leq r_2 \leq K_1 \times$$

$$(1 - n_1') \times \beta_1 S_1 \, K_1 \times n_1' \times \beta_1 S_1 \leq d_1' \leq K_2 \times n_1' \times \beta_1 S_1$$

$$\beta_1 S_1 K_1 \times \frac{-S_1/Fe}{\sqrt{1 - \left(\frac{1}{2Fe}\right)^2}} \leq \phi_1 \leq K_2 \times$$

$$\frac{-S_1/Fe}{\sqrt{1 - \left(\frac{1}{2Fe}\right)^2}} K_1 \times \phi_1 \times \frac{\left(\frac{S_2'}{\beta_1}\right) - S_1}{\beta_1 S_1} \leq$$

$$\phi_0 \leq K_2 \times \phi_1 \times \frac{\left(\frac{S_2'}{\beta_1}\right) - S_1}{\beta_1 S_1} \quad K_1 = 0.9, K_2 = 1.1$$

where $r_1$ and $r_2$ represent the curvature radii of the object side surface and the image side surface of the first bar lens, $d_1'$ represents the thickness of the lens on the optic axis thereof, $\phi_1$ represents the effective diameter of the lens, $\phi_0$ represents the size of the object, $n_1'$ represents the refractive index for design wavelength, $\beta_1$ represents the lateral magnification, $S_1$ represents the distance from the object side surface to the object surface along the optic axis, $S_2'$ represents the distance from the image side surface to the intermediate image plane along the optic axis, and Fe represents the object side effective F-number;

for the second bar lens:

$$K_1 \times (1 - n_2') \times \frac{S_4'}{\beta_2} \leq r_3 \leq K_2 \times (1 - n_2') \times \frac{S_4'}{\beta_2} K_2 \times$$

$$(n_2' - 1) \times \frac{S_4'/\beta_2}{1 - \left(\frac{1}{\beta_2}\right) - \frac{S_3 \times \beta_2}{S_4'}} \leq r_4 \leq K_1 \times$$

$$(n_2' - 1) \times \frac{S_4'/\beta_2}{\left(1 - \frac{1}{\beta_2}\right) - \frac{S_3 \times \beta_2}{S_4'}} \quad K_1 \times (-n_2') \times$$

$$S_4'/\beta_2 \leq d_2' \leq K_2 \times (n_2') \times S_4'/\beta_2 \, K_1 \times \frac{S_4'/Fe'}{\sqrt{1 - \left(\frac{1}{2Fe'}\right)^2}}$$

$$\leq \phi_3 \leq K_2 \times \frac{S_4'/Fe'}{\sqrt{1 - \left(\frac{1}{2Fe'}\right)^2}} K_1 \times \phi_3 \times$$

$$\frac{S_3\beta_2 - S_4'}{S_4'/\beta_2} \leq \phi_4 \leq K_2 \times \phi_3 \times \frac{S_3\beta_2 - S_4'}{S_4'/\beta_2} \quad K_1 = 0.9, K_2 = 1.1$$

where $r_3$ and $r_4$ represent the curvature radii of the object side surface and the image side surface of the second bar lens, $d_2'$ represents the thickness of the lens on the optic axis, $\phi_3$ represents the effective diameter of the lens, $\phi_4$ represents the size of the projected image, $n_2'$ represents the refractive index for design wavelength, $\beta_2$ represents the lateral magnification, $S_3$ represents the distance from the object side surface to the intermediate image plane along the optic axis, $S_4'$ represents the distance from the image side surface to the projected image plane along the optic axis, and Fe' represents the image side effective F-number.

6. The projection device according to claim 5, which satisfies the following equations:

$$r_3 = -r_2, \, r_4 = -r_1, \, d_2' = d_1', \, n_2' = n_1',$$
$$\phi_3 = \phi_1, \, \phi_4 = \phi_0,$$
$$\beta_2 = \frac{1}{\beta_1}, \, S_3 =$$
$$-S_2', \, S_4' = -S_1, \, Fe' = Fe.$$

7. The projection device according to claim 5 or 6, wherein the arrangement interval of the element lens systems satisfies the following equation:

$$K_1 \times \phi_{01}/2 \leq a \leq K_2 \times \phi_{01}/2,$$

where a represents the arrangement interval, $\phi_{01}$ represents the effective object field diameter, $K_1 = 0.9$ and $K_2 = 1.1$.

8. The projection device according to claim 4, wherein the first and second bar lenses satisfy the following lens equations:

for the first bar lens:

$$-K_1 \times (n_1' - 1) \times S_1 \leq r_1 \leq -K_2 \times (n_1' - 1) \times S_1$$
$$K_2 \times S_1 \times \beta_1 \times (1 - n_1') \leq r_2 \leq K_1 \times S_1 \times \beta_1 \times (1 - n_1')$$
$$2 \times K_1 \times n_1' \times S_1 \times \beta_1 \leq d_1' \leq 2 \times K_2 \times n_1' \times S_1 \times \beta_1$$

$$K_1 \times \frac{-S_1/Fe}{\sqrt{1 - \left(\frac{1}{2Fe}\right)^2}} \leq \phi_1 \leq K_2 \times \frac{-S_1/Fe}{\sqrt{1 - \left(\frac{1}{2Fe}\right)^2}}$$

$$-K_1 \times \frac{\phi_1}{\beta_1} \leq \phi_0 \leq -K_2 \times \frac{\phi_1}{\beta_1}$$
$$K_1 = 0.9, K_2 = 1.1$$

where $r_1$ and $r_2$ represent the curvature radii of the object side surface and the image side surface of the first bar lens, $d_1'$ represents the thickness of the lens on the optic axis, $\phi_1$ represents the effective diameter of the lens, $\phi_0$ represents the size of the object, $n_1'$ represents the refractive index for design wavelength, $\beta_1$ represents the lateral magnification, $S_1$ represents the distance from the object side surface to the object surface along the optic axis, $S_2'$ represents the distance from the image side surface to the intermediate image plane along the optic axis, and Fe represents the object side effective F-number;

for the second bar lens:

$$K_1 \times S_4' \times \frac{1}{\beta_2} \times (1 - n_2') \leq$$
$$r_3 \leq K_2 \times S_4' \times \frac{1}{\beta_2} \times (1 - n_2')$$
$$K_2 \times (1 - n_2') \times S_4' \leq r_4 \leq K_1 \times (1 - n_2') \times S_4'$$
$$-2 \times K_1 \times n_2' \times S_4' \times \frac{1}{\beta_2} \leq d_1' \leq -2 \times K_2 \times n_2' \times S_4' \times \frac{1}{\beta_2}$$

$$K_1 \times \frac{S_4'/Fe'}{\sqrt{1 - \left(\frac{1}{2Fe'}\right)^2}} \leq \phi_3 \leq K_2 \times \frac{S_4'/Fe'}{\sqrt{1 - \left(\frac{1}{2Fe'}\right)^2}}$$

$$-K_1 \times \beta_2 \times \phi_3 \leq \phi_4 \leq -K_2 \times \beta_2 \times \phi_3$$

-continued $K_1 = 0.9, K_2 = 1.1.$

9. The projection device according to claim 8, which satisfies the following equations:

$r_3 = r_2, r_4 = r_1, d_2' = d_1', n_2' = n_1', \phi_3 = \phi_1, \phi_4 = \phi_0,$
$\beta_2 = \frac{1}{\beta_1}, S_3 = -S_2', S_4' = -S_1, Fe' = Fe.$ 10. The projection device according to claim 8 or 9, wherein the arrangement interval of the element lens systems satisifies the following equation:

$M_1 \times \phi_1 < a < M_2 \times \phi_1,$ where a represents the arrangement interval, $\phi_1$ represents the effective diameter of the bar lens, $M_1 = 1.18$ and $M_2 = 1.36$.

11. A projection device comprising:
a plurality of bar lenses having a greater length in the direction of the optical axis thereof as compared with the effective diameter thereof, each bar lens controlling, by aperture eclipse, the light intensity distribution over a predetermined partial area on an image plane corresponding to a partial area of an object, said light intensity distribution being weaker in light intensity in the marginal area thereof than in at least the central area thereof, said bar lenses being substantially equidistantly arranged with a predetermined pitch in a predetermined direction in a plane perpendicular to the optical axis so that the light intensity distributions are superposed upon one another in at least said marginal areas to be substantially uniform in the exposure amount distributions even if there is an error in the arrangement interval of the bar lenses;
a half-mirror provided on the incidence side of said bar lenses, a mirror provided on the exit side of said bar lenses to reflect the light rays back to the same bar lenses; and
a light absorbing member associated with each bar lens for attenuating and extinguishing unnecessary light rays which reach the portion of the associated bar lens other than the effective diameter area thereof.

* * * * *